June 3, 1952
C. H. COOKE
2,598,891
SELECTOR VALVE-AUTOMATIC HOLDING AND CUTOFF
Filed Oct. 5, 1946
2 SHEETS—SHEET 1
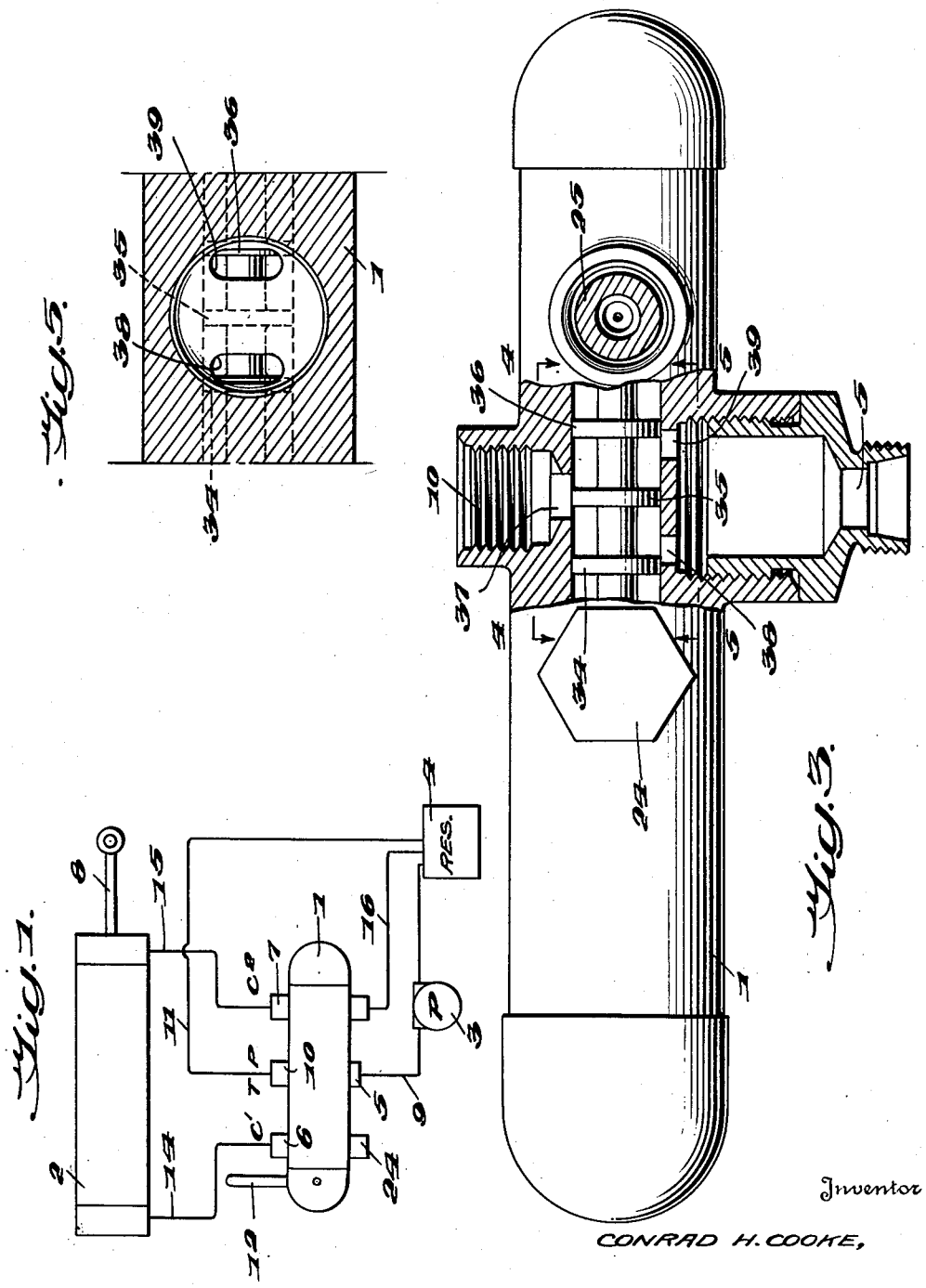
Inventor
CONRAD H. COOKE,
By Donald W Farrington
Attorney

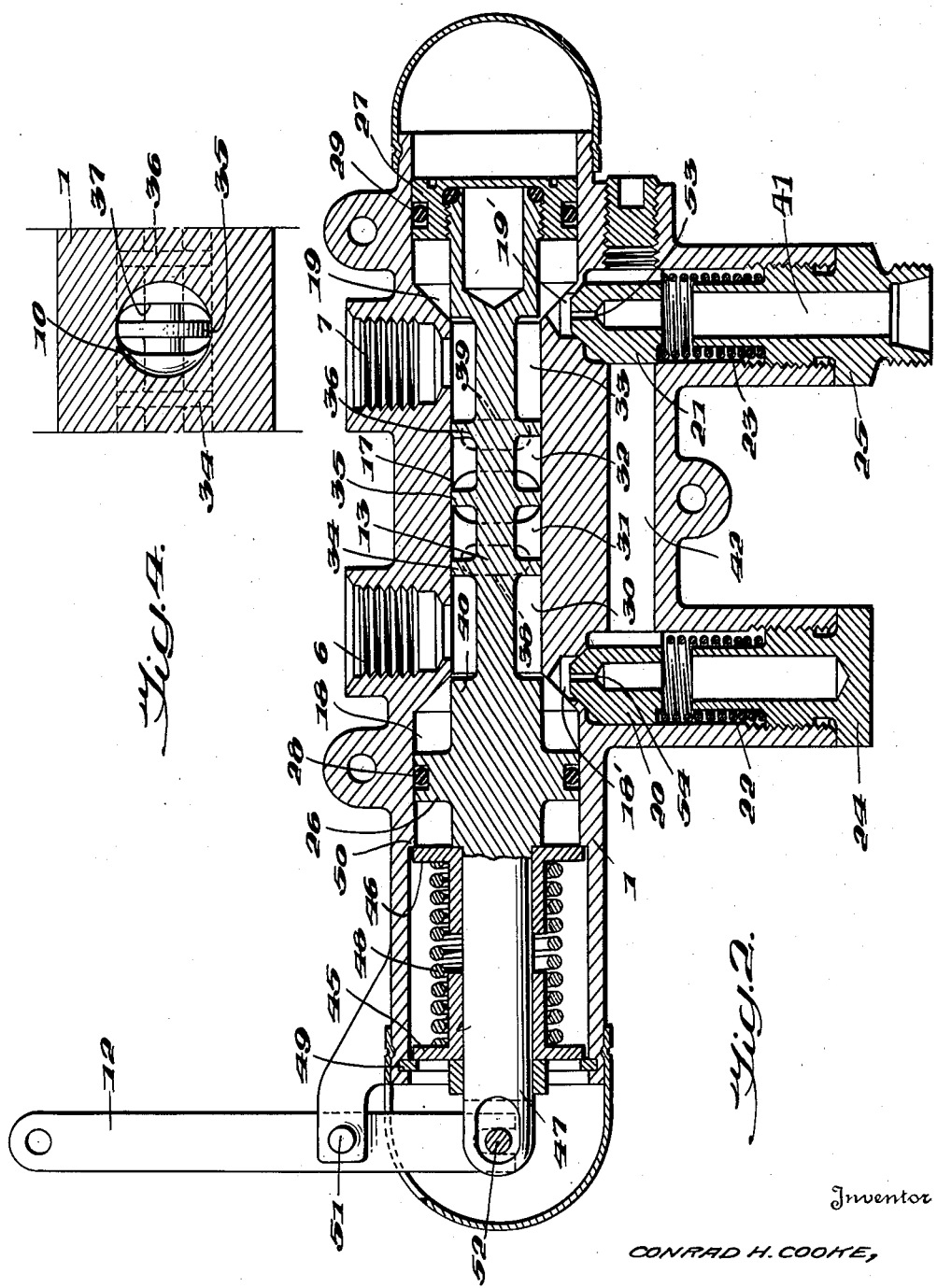

Patented June 3, 1952

2,598,891

UNITED STATES PATENT OFFICE 2,598,891

SELECTOR VALVE-AUTOMATIC HOLDING AND CUTOFF

Conrad H. Cooke, Middle River, Md., assignor, by direct and mesne assignments, of one-half to The Glenn L. Martin Company, Middle River, Md., a corporation of Maryland, and one-half to Hydraulic Equipment Company, Cleveland, Ohio, a corporation of Ohio Application October 5, 1946, Serial No. 701,599

8 Claims. (Cl. 60—52)

This invention relates to a selector valve for use in a hydraulic system that is characterized by automatic holding and shut-off features.

A selector valve in its simplest form is a valve that is interposed in the supply and return lines of the hydraulic system for the operation of a double acting hydraulic cylinder. When the valve is one that is interposed in a circuit including a pump and a reservoir, through which circuit fluid continuously flows, the system is referred to as an open center system. The valve permits the passage of fluid through the circuit in its neutral position, and when shifted to an operative position for the actuation of the hydraulic cylinder, the flow is diverted from the continuous stream to one or the other lines connected to the ends of the hydraulic cylinder, the other line on the hydraulic cylinder serving to return the exhaust fluid through the valve to the reservoir.

In most selector valves, it is necessary to manually displace the valve to direct the flow of fluid to the hydraulic cylinder, and watch the operation of the cylinder, or some actuated part, or a signal system, to tell when to release the selector valve or return it to its neutral position. When a selector valve is used on a complicated machine, or for the operation of some aircraft component, the operator, having many things to do, can scarcely be expected to hold the valve in the displaced position and return it to the neutral position upon the completion of the actuation of the cylinder. With the valve of this invention, it is merely necessary to displace the valve and it will automatically cut off the flow of fluid to actuate the cylinder after holding the valve displaced during the actuation of the cylinder. The automatic holding and cut-off features of the valve herein described can be utilized in either a simple selector valve or on the open center type valve.

It is an object of this invention to provide a selector valve that need not be manually held during the actuation of a hydraulic cylinder.

It is another object of this invention to provide a selector valve that requires only an initial displacement of the valve for the actuation of a hydraulic cylinder and the valve will cut off the flow and return to the neutral position when the cylinder has been fully actuated.

It is a further object of this invention to provide a valve and hydraulic system that utilizes a slight back pressure in the return line to hold the valve in the operative position during the actuation of the hydraulic system.

Further and other objects will become apparent from the description of the accompanying drawings which form a part of this disclosure and in which like numerals refer to like parts.

In the drawings:

Figure 1 is a schematic diagram of a hydraulic system including the valve.

Figure 2 is a longitudinal section through the valve.

Figure 3 is a plan view of the valve partly in section.

Figure 4 is a fragmentary section taken on the line 4—4 of Figure 3.

Figure 5 is a fragmentary section taken on the line 5—5 of Figure 3.

The valve generally indicated as 1 is a selector valve in a hydraulic system that is interposed between cylinder 2 and pressure pump 3. The pump delivers hydraulic fluid under pressure from reservoir 4 to the pressure port 5 of the valve. Depending upon the position of the valve, fluid pressure will be directed through power port 6 to 7 to either end of hydraulic cylinder 2, to cause the strut 8 to move to the right or the left. This valve, shown embodying the invention, is of a type known as an open center valve, which means that a pump continuously circulates hydraulic fluid in the system containing the valve. That is, pump 3 forces fluid under pressure through line 9 to port 5 and when the valve is in the neutral or inoperative position, fluid flows out of the valve through port 10, line 11, and returns to the reservoir. Movement of the valve handle 12 to the right or to the left moves valve 13 which directs fluid pressure through either port 6 or 7. When fluid pressure is directed through port 6 and line 14 to the left hand end of cylinder 2, strut 8 is extended and fluid in the right hand end of the cylinder is returned to the reservoir through line 15, port 7, and return line 16.

Valve 1, shown in Figure 2, comprises a housing having a cylindrical bore 17 extending through the housing with enlarged chambers 18 and 19 in either end. Ports 6 and 7 are in communication with bore 17. Ports 18' and 19' are closed by poppet valves 20 and 21, which are held firmly against their respective valve seats by springs 22 and 23. The body portion of poppet valves 20 and 21 have three or more flat sides to permit fluid flow around them. Spring 22 is retained by plug 24 and spring 23 is retained by nipple 25.

Secured on valve 13 in chamber 18 is a flange member forming a piston 26, and in chamber 19, a flange member forming a piston 27. These pistons are sealed with respect to the chamber wall by seals 28 and 29, respectively. Valve 13 is undercut at 30, 31, 32 and 33 to provide passages for the flow of fluid and form flanges 34, 35 and 36. Through-pressure port 37 is centrally located and spans flange 35 when the valve is in the neutral position. Pressure inlet ports 38 and 39 are controlled by flanges 34 and 36, so that when the valve is in the neutral position, fluid will flow from pressure port 5 through ports 38 and 39, undercut portions 31 and 32, through port 37 and via pressure port 10 and return line 11 to the reservoir. When the valve is moved to the right, port 38 is put in communication with undercut portion 30 and outlet port 6 to direct fluid pressure through line 14. Shoulder 40 moves into bore 17 to limit the high pressure fluid to outlet port 6. Flanges 35 and 36 come to rest between port 37 and port 7 along the bore 17, so that port 39 opens into the closed space 32. The return path for the fluid to the valve from the right hand end of cylinder 2 is afforded by line 15 and port 7. Fluid passes from port 7 into chamber 19, through port 19', and opens poppet valve 21 so the fluid may escape from port 41 to return line 16.

When the valve is moved to the left, flanges 34 and 35 come to rest along the wall of bore 17 between ports 6 and 37 so that fluid pressure is directed through port 39, port 7 and line 15 to the cylinder, and the return from the cylinder to the valve is afforded by line 14 in port 6. Fluid flows within the valve from port 6, into chamber 18, through port 18', and opens poppet valve 20 and escapes through passage 42 to port 41 and line 16 to the reservoir.

A valve centering mechanism is afforded by flanges 45 and 46 mounted on an extension 47 of valve 13. Spring 48 maintains flanges 45 and 46 against stop 49 and shoulder 50. It can be seen that as the valve is moved to the right or to the left, flange 45 or 46 will compress the spring and restore the valve to the neutral position when the force moving the valve is relieved. Lever 12 is pivoted at 51 and connected at 52 to move the valve assembly.

It will be noted that fluid returning to the reservoir from either end of the hydraulic system is restricted in its flow by spring-loaded poppet valves 20 and 21. This restriction in the flow builds up the pressure in the return flow system in chambers 18 and 19. It will be noted that pistons 26 and 27 are subjected to any pressure in the return flow system. Therefore, when lever 12 is actuated to move the valve to the right, the flow will, as described above, actuate the cylinder and move strut 8, and the return flow from the cylinder to the reservoir will be restricted as it passes through line 15, port 7, chamber 19 and port 19'. The pressure built up by the spring-loaded poppet valve in the return line, acting against piston 27, will hold the valve in the displaced position as long as hydraulic fluid is flowing to and from the hydraulic cylinder to actuate the strut. When the strut has reached its extended position and flow from the cylinder stops, poppet valve 21 will seat and close port 19'. The fluid under residual pressure in chamber 19 will flow through bleed port 53 in poppet valve 21 as spring 48 tends to restore the valve to its neutral position.

When the lever 12 is operated to move valve 13 to the left and cause fluid to flow to retract strut 8 in cylinder 2, the fluid from the cylinder will return through line 14 and port 6. The return fluid will be restricted in its flow by poppet valve 20, and piston 26, actuated by the return fluid under pressure, will hold the valve in the displaced position automatically while the strut is being retracted, and upon full retraction of the strut and the cessation of the flow of fluid, the pressure will drop and spring 48 will return the valve to the neutral position.

By the valve structure, herein described, it is possible to operate hydraulic cylinder 2 to extend or retract strut 8 by merely initially displacing control lever 12. It is not necessary to hold the control lever in the displaced position. This is done by the retricted flow in the return line. When the extension or retraction of the strut is complete, the flow of fluid thereto stops, the valve is restored to its neutral position and the flow is resumed between the pressure port and the through-pressure port in the continuous circulatory system.

It is to be understood that certain changes, alterations, modifications and substitutions can be made without departing from the spirit and scope of the appended claims.

I claim as my invention:

1. In a hydraulic system including a double acting hydraulic cylinder having pressure and return lines, a selector valves, means to supply hydraulic fluid pressure to said valve, means in said valve to control the flow of fluid to said cylinder, passage means formed in said valve to conduct returning exhaust hydraulic fluid from said cylinder, means in said valve to restrict the flow of return fluid to build up a small back pressure in the return line, means actuated by said return line back pressure to hold said valve in the open position until the cylinder is fully actuated, and means to move said selector valve to the neutral position upon the cessation of exhaust flow from said cylinder and the consequent decrease of back pressure in said return line.

2. In an open center hydraulic system including a double acting hydraulic cylinder having pressure and return lines, a selector valve having inlet and outlet ports for the continuously circulating fluid, and inlet and outlet ports for the flow and return of fluid from the valve to the cylinder, means to supply hydraulic fluid pressure to said valve, means in said valve to control the flow of fluid to said cylinder, passage means formed in said valve to permit the return of exhaust hydraulic fluid from said cylinder, means in said fluid return ports of said valve to restrict the flow of return fluid to build up a small back pressure in the return line, means actuated by said return line back pressure to hold said valve in the open position until the cylinder is fully actuated, and spring means to move said selector valve to the neutral position upon the cessation of exhaust flow from said cylinder and the decrease of back pressure in said return line.

3. In an open center hydraulic system, a double acting hydraulic cylinder having pressure and return lines, a selector valve having inlet and outlet ports for the continuously circulating fluid, and other inlet and outlet ports for the flow and return of fluid to the hydraulic cylinder, spring means to position the valve in the normal continuous flow or neutral condition, passage means formed in the valve to direct the flow of fluid to actuate the cylinder when the valve is displaced from the neutral position and other passage means formed in the valve to afford a return line for the exhaust fluid from the cylinder, restrictor means in said return line to build up a small back pressure within the valve, means actuated by said return line back pressure to hold said valve in the open position until the cylinder is fully actuated, and said spring means being constructed to move said selector valve to the neutral position upon the cessation of exhaust flow from said cylinder and the decrease of back pressure in said return line.

4. In an open center hydraulic system, a double acting hydraulic cylinder having pressure and return lines, a selector valve having inlet and outlet ports for the continuously circulating fluid, and other inlet and outlet ports for the flow and return of fluid to the hydraulic cylinder, spring means to position the valve in the normal continuous flow or neutral condition, passage means formed in the valve to direct the flow of fluid to actuate the cylinder when the valve is displaced from the neutral position and other passage means formed in the valve to afford a return line for the exhaust fluid from the cylinder, restrictor means in said return line to build up a small back pressure within the valve, a chamber formed in said valve in communication with said return flow, a piston in said chamber actuated by the back pressure of the return flow to hold the valve in the displaced position during the actuation of said cylinder, said spring means being arranged to move said selector valve to the neutral position upon the cessation of exhaust flow from said cylinder and the decrease of back pressure in said return line.

5. In a hydraulic system including a double acting hydraulic cylinder having pressure and return lines, a selector valve in said system, means to supply hydraulic fluid pressure to said valve, means in said valve to control the flow of fluid to said cylinder, passage means formed in said valve to permit the return of exhaust hydraulic fluid from said cylinder, means in said valve to restrict the flow of return fluid to build up a small back pressure in the return line, a chamber formed in said valve in communication with said return flow, a piston in said chamber actuated by the back pressure of the return flow to hold the valve in the displaced position during the actuation of said cylinder, and means to move said selector valve to the neutral position upon the cessation of exhaust flow from said cylinder and the decrease of back pressure in said return line.

6. In a hydraulic control mechanism, a hydraulic cylinder, a piston therein, a pump for supplying fluid under pressure, and a valve for directing fluid selectively to either side of the piston and directing return of fluid from the opposite side, means in said valve to restrict the flow of return fluid to build up a small back pressure in the return line, means effective upon fully opening said valve and responsive to said return line back pressure to hold the valve open until the piston reaches the end of its stroke and then to permit automatic return of the valve to a neutral position upon cessation of exhaust flow from said cylinder and decrease of back pressure in said return line.

7. A selector valve for use between a pump, a tank and a double acting hydraulic cylinder, in combination, a housing having two longitudinally spaced inlet ports for high pressure fluid and an intermediately positioned outlet port, two power ports straddling the inlet ports for the flow and return of fluid from the valve to the cylinder and two low pressure chambers straddling the power ports, a plunger reciprocable in said housing and having a piston in each of said chambers facing toward the adjacent power port and forming a fluid-tight outer end wall for the associated chamber, resilient centralizing means for said plunger, means including a plurality of disc-like flanges spaced on said plunger to provide isolated passages adapted when the plunger is moved from neutral to either extreme to connect respectively one of said spaced inlet ports and a power port, while blocking communication between said power port and the adjacent chamber and to connect the other power port and the other one of said chambers and to isolate the other inlet port between two of the discs, each of said chambers having a restricted discharge port whereby liquid returning from the cylinder builds up a pressure in the connected chamber acting against its piston to hold the valve plunger in its extreme position against the action of the centralizing means.

8. In a control valve of the type described, in combination, a housing, a chamber therein for high pressure liquid, a pair of power chambers, a pair of low pressure chambers, a bore intersecting all of said chambers, said low pressure chambers being at opposite ends of said bore, a valve plunger operatively positioned in said bore and so constructed and arranged that in the "neutral" or central position the power chambers are isolated, and in either "power" or end position one power chamber is connected to the high pressure chamber and the other to one of the low pressure chambers, a restricted vent for each low pressure chamber whereby pressure may be built up therein when connected to a power chamber, an area on each portion of said plunger extending into said low pressure chambers forming a fluid-tight outer end wall for the associated chamber and adapted to be subjected to the built-up pressure therein to hold the plunger in the power position to which it has been manually moved and a centering means for said plunger of insufficient strength to overcome said holding pressure.

CONRAD H. COOKE.

REFERENCES CITED

The following references are of record in the file of this patent:

UNITED STATES PATENTS

| Number | Name | Date |
|---|---|---|
| 2,169,470 | Miller | Aug. 15, 1939 |
| 2,448,532 | Kirkham | Sept. 7, 1948 |
| 2,448,557 | Stephens | Sept. 7, 1948 |

FOREIGN PATENTS

| Number | Country | Date |
|---|---|---|
| 204,682 | Great Britain | Aug. 14, 1924 |